United States Patent
Kollipara et al.

(10) Patent No.: US 9,306,758 B2
(45) Date of Patent: Apr. 5, 2016

(54) DYNAMIC ADJUSTMENT OF MLDP TUNNEL AND PIM BINDING

(71) Applicants: Siva Kollipara, Mountain View, CA (US); Jayant Kotalwar, Mountain View, CA (US)

(72) Inventors: Siva Kollipara, Mountain View, CA (US); Jayant Kotalwar, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 391 days.

(21) Appl. No.: 13/780,234

(22) Filed: Feb. 28, 2013

(65) Prior Publication Data
US 2014/0241352 A1    Aug. 28, 2014

(51) Int. Cl.
| H04L 12/18 | (2006.01) |
| H04L 12/761 | (2013.01) |
| H04L 12/931 | (2013.01) |
| H04L 29/12 | (2006.01) |
| H04L 12/723 | (2013.01) |

(52) U.S. Cl.
CPC .............. *H04L 12/185* (2013.01); *H04L 45/16* (2013.01); *H04L 45/507* (2013.01); *H04L 49/201* (2013.01); *H04L 61/2069* (2013.01)

(58) Field of Classification Search
None
See application file for complete search history.

(56) References Cited

U.S. PATENT DOCUMENTS

| 6,580,722 | B1 * | 6/2003 | Perlman ........................ 370/432 |
| 8,611,346 | B1 * | 12/2013 | Wijnands .............. H04L 12/185 370/312 |
| 8,958,286 | B1 * | 2/2015 | Atlas et al. ..................... 370/225 |
| 2011/0188499 | A1 * | 8/2011 | Wijnands et al. ............. 370/390 |
| 2013/0010790 | A1 * | 1/2013 | Shao ........................ H04L 45/16 370/390 |
| 2014/0016457 | A1 * | 1/2014 | Enyedi et al. ................. 370/225 |

OTHER PUBLICATIONS

Wijnands, et al., "Multipoint LDP In-Band Signaling for Point-to-Multipoint and Multipoint-to-Multipoint Label Switched Paths draft-ieft-mpls-mldp-in-band-signaling-04," Network Working Group, May 18, 2011.
Wijnands, et al., "Multipoint LDP In-Band Signaling for Point-to-Multipoint and Multipoint-to-Multipoint Label Switched Paths," Internet Engineering Task Force, RFC 6826, Jan. 2013.

* cited by examiner

*Primary Examiner* — Ashley Shivers
(74) *Attorney, Agent, or Firm* — Tong, Bea, Bentley & Kim, LLP

(57) ABSTRACT

A capability is provided for modifying association of a Multicast Label Distribution Protocol (MLDP) tunnel with Protocol Independent Multicast (PIM). Information associated with a multicast source and multicast group (multicast SG) is received. The multicast SG is associated with an MLDP tunnel. Association of the MLDP tunnel with an outgoing interface list of the multicast SG is modified by faking an Internet Group Management Protocol (IGMP) local membership operation for the multicast SG on the MLDP tunnel. Modifying association of the MLDP tunnel with the outgoing interface list of the multicast SG includes adding the MLDP tunnel to the outgoing interface list of the multicast SG by faking an IGMP local membership join for the multicast SG on the MLDP tunnel or removing the MLDP tunnel from the outgoing interface list of the multicast SG by faking an IGMP local membership prune for the multicast SG on the MLDP tunnel.

20 Claims, 9 Drawing Sheets

US 9,306,758 B2

DYNAMIC ADJUSTMENT OF MLDP TUNNEL AND PIM BINDING

TECHNICAL FIELD

The disclosure relates generally to communication networks and, more specifically but not exclusively, to multicast communication networks.

BACKGROUND

Multicast may be used in communication networks in order to deliver data from a source device to a group of destination devices. The source device may be referred to as a multicast source and the group of destination devices permitted to receive the multicast data may be referred to as a multicast group. There are many varieties of multicast which may be used to deliver data from a source computer to a group of destination computers. One type of multicast is Internet Protocol (IP) multicast, which is often used in IP applications such as streaming media, IP television (IPTV), and the like.

Multicast of data from a multicast source to a multicast group may be supported using various types of communication networks. For example, Multiprotocol Label Switching (MPLS) networks may be used to support multicast services. MPLS networks support paths known as Label Switched Paths (LSPs). The Label Distribution Protocol (LDP) is a routing protocol which may be used to support exchange of label mapping information for LSPs in MPLS networks. The Multicast Label Distribution Protocol (MLDP) provides extensions to the LDP for the setup of point-to-multipoint (P2MP) LSPs and multipoint-to-multipoint (MP2MP) LSPs in MPLS networks.

Multicast of data from a multicast source to a multicast group also may be supported using various types of communication protocols. For example, Protocol Independent Multicast (PIM) is a collection of multicast routing protocols including, among others, PIM Sparse Mode (PIM-SM), PIM Dense Mode (PIM-DM), Bidirectional PIM, PIM—Source Specific Multicast (PIM-SSM), and so forth. PIM protocols typically use routing information supplied by other routing protocols (e.g., Routing Information Protocol (RIP), Open Shortest Path First (OSPF), Border Gateway Protocol (BGP), Multicast Source Discovery Protocol (MSDP), and so forth.

PIM-SM is suited for multicast groups that will be sparsely distributed throughout a network. PIM-SM supports the use of source-based trees, in which a separate multicast distribution tree (MDT) is built for each source that sends data to a multicast group, which enables the use of Source Specific Multicast (SSM) in which a host identifies a multicast data stream in a multicast join/prune message by a multicast source (S) and multicast group (G) address pair (S, G). PIM-SM also supports any-source multicast (ASM) in which a host identifies a multicast data stream by a multicast rendezvous point (RP) and multicast group (G) address pair (*,G).

PIM-SM requires that routers of a network supporting a multicast data stream explicitly request to join the MDT of the data stream. The routers may send requests to join the MDT to their upstream neighboring routers in the network. The routers may use PIM join message and PIM prune messages to join and leave MDTs respectively.

In some cases, a network operator may wish to disable PIM in the multicast distribution network and, rather, to use MLDP in order to support the multicast traffic, as described in Internet Engineering Task Force (IETF) Request For Comment (RFC) 6826.

SUMMARY OF EMBODIMENTS

Various deficiencies in the prior art may be addressed by embodiments for modifying association of a Multicast Label Distribution Protocol (MLDP) tunnel with Protocol Independent Multicast (PIM).

In one embodiment, an apparatus includes a processor and a memory communicatively connected to the processor, where the processor is configured to receive information associated with a multicast source and multicast group (multicast SG) that is associated with an MLDP tunnel, and modify association of the MLDP tunnel with an outgoing interface list of the multicast SG by faking an Internet Group Management Protocol (IGMP) local membership operation for the multicast SG on the MLDP tunnel.

In one embodiment, a method includes using a processor and a memory for receiving information associated with a multicast source and multicast group (multicast SG) that is associated with an MLDP tunnel, and modifying association of the MLDP tunnel with an outgoing interface list of the multicast SG by faking an Internet Group Management Protocol (IGMP) local membership operation for the multicast SG on the MLDP tunnel.

In one embodiment, a computer-readable storage medium stores instructions which, when executed by a computer, cause the computer to perform a method including receiving information associated with a multicast source and multicast group (multicast SG) that is associated with an MLDP tunnel, and modifying association of the MLDP tunnel with an outgoing interface list of the multicast SG by faking an Internet Group Management Protocol (IGMP) local membership operation for the multicast SG on the MLDP tunnel.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

Figure 1:
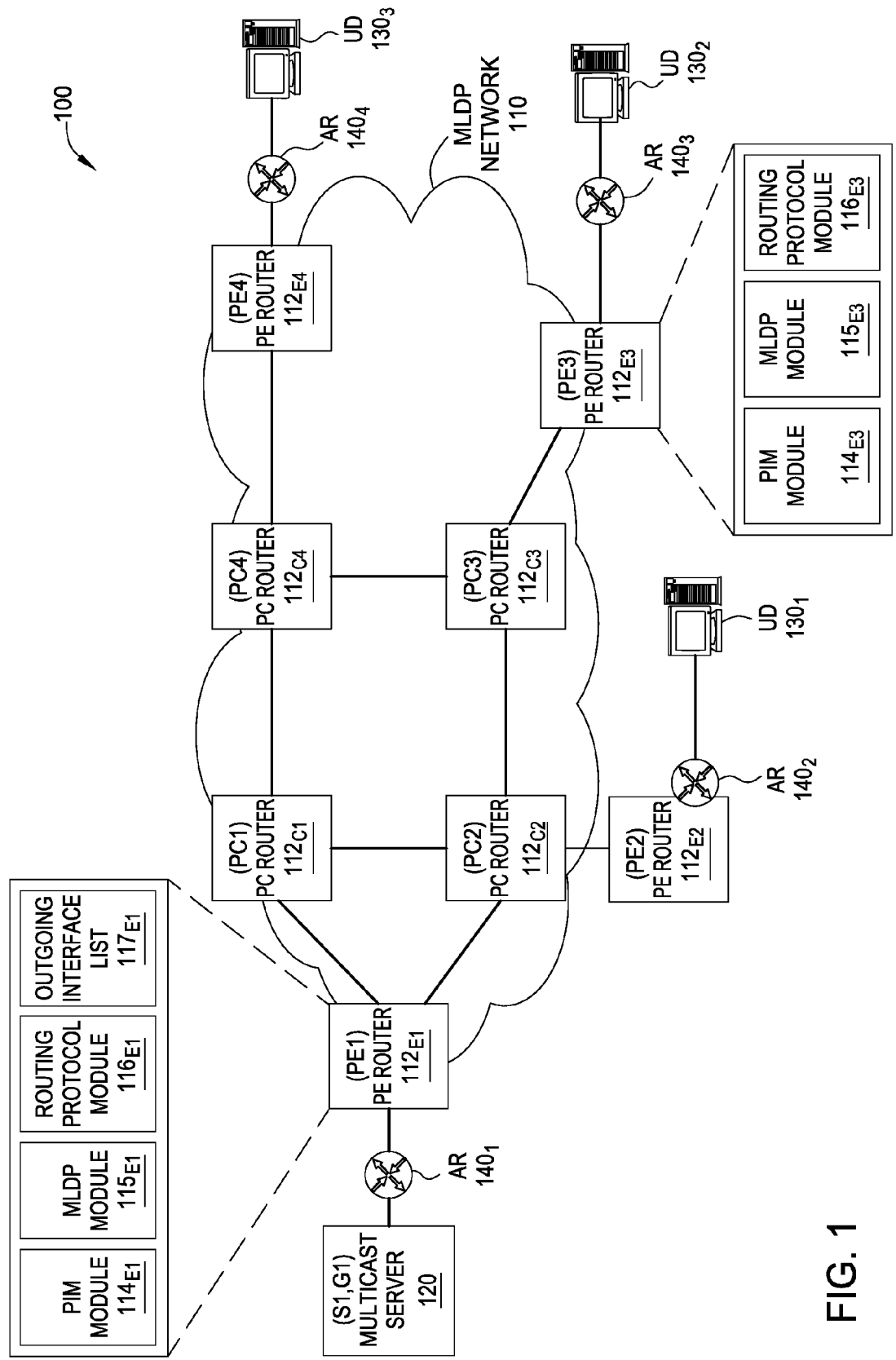
FIG. 1 depicts a high-level block diagram of a communication system including an MLDP network.

In general, various capabilities are provided for controlling and managing aspects related to use of the Multicast Label Distribution Protocol (MLDP) to support multicast services.

Multicast may be used in communication networks in order to deliver data from a multicast source to a multicast group. Multicast of data from a multicast source to a multicast group may be supported using various types of communication networks, including Multiprotocol Label Switching (MPLS) networks. MPLS networks support paths known as Label Switched Paths (LSPs). LDP is a routing protocol which may be used to support exchange of label mapping information for LSPs in MPLS networks, and MLDP provides extensions to LDP for the setup of point-to-multipoint (P2MP) LSPs and multipoint-to-multipoint (MP2MP) LSPs in MPLS networks. Multicast of data from a multicast source to a multicast group also may be supported using various types of communication protocols, including PIM, MLDP, and the like.

The propagation of multicast data from a multicast source to a multicast group may use a Multicast Distribution Tree (MDT) to connect a source router associated with the multicast source to a plurality of destination routers serving the members of the multicast group. The source router forms the root of the MDT, while the destination routers form the leaf nodes of the MDT. As discussed herein, PIM may be used to create/remove an MDT for a multicast group. For example, nodes may join and leave an MDT at any time using PIM join and prune messages, as described in more detail in various PIM-related IETF documents. The PIM join and leave messages sent by nodes joining and leaving an MDT identify the MDT by a combination of a multicast group identifier (e.g., multicast group address) and a multicast source identifier (e.g., multicast source address), where the multicast source identifier may be a wildcard (*). The combination of the multicast source (denoted as S) and the multicast group (G) may be referred to herein as a multicast source and group (multicast SG).

In some cases, a network operator may wish to use MLDP, rather than PIM, in the multicast distribution network in order to transport the MDT traffic for the multicast SG using an MLDP tunnel (e.g., the MDT is mapped to the MLDP tunnel). Various embodiments may be provided to support use of an MLDP tunnel to transport multicast traffic for a multicast SG.

In at least some embodiments, the root node of an MLDP tunnel is dynamically determined in response to receiving a PIM multicast group join request. In at least some embodiments, a binding of an MLDP tunnel with PIM is established (e.g., in response to receiving an MLDP tunnel message indicative of creation of an MLDP tunnel in an MLDP network) or a binding of an MLDP tunnel with PIM is removed (e.g., in response to receiving an MLDP tunnel message indicative of removal of an MLDP tunnel in an MLDP network). It will be appreciated that various combinations of such embodiments may be utilized to support delivery of multicast services via an MLDP tunnel. It is noted that such embodiments may be used to enable use of MLDP, rather than PIM, to support multicast traffic for a multicast group. The operation of such embodiments may be better understood by way of reference to the exemplary MLDP network of FIG. 1.

FIG. 1 depicts a high-level block diagram of a communication system including an MLDP network.

The communication system 100 includes an MLDP network 110, a multicast server (MS) 120 configured to access the MLDP network 110 via an associated access router (AR) $140_1$, and plurality of user devices (UDs) $130_1$-$130_3$ (collectively, UDs 130) configured to access the MPLS network 110 via a plurality of access routers (ARs) $140_2$-$140_4$. The ARs $140_1$-$140_4$ may be referred to collectively as ARs 140.

The MLDP network may be an MPLS network running the MLDP, where the MLDP provides extensions to the LDP for the setup and teardown of P2MP LSPs and MP2MP LSPs in the MPLS network.

The MLDP network 110 includes four provider edge (PE) routers $112_{E1}$-$112_{E4}$ (collectively, PE routers $112_E$, which also may be referred to herein as PE1, PE2, PE3, and PE4, respectively) and four provider core (PC) routers $112_{C1}$-$112_{C4}$ (collectively, PC routers 112, which also may be referred to herein as PC1, PC2, PC3, and PC4, respectively). The four PE routers $112_{E1}$-$112_{E4}$ are communicatively connected to the ARs $140_1$-$140_4$, respectively. The PE router $112_{E1}$ is communicatively connected to PC routers $112_{C1}$ and $112_{C2}$, the PE router $112_{E2}$ is communicatively connected to PC router $112_{C2}$, the PE router $112_{E3}$ is communicatively connected to PC router $112_{C3}$, and the PE router $112_{E4}$ is communicatively connected to PC router $112_{C4}$. The PC router $112_{C1}$ is communicatively connected to PC routers $112_{C2}$ and $112_{C4}$, the PC router $112_{C2}$ is communicatively connected to PC routers $112_{C1}$ and $112_{C3}$, the PC router $112_{C3}$ is communicatively connected to PC routers $112_{C2}$ and $112_{C4}$, and the PC router $112_{C4}$ is communicatively connected to PC routers $112_{C1}$ and $112_{C3}$. The PE routers $112_E$ and PC routers $112_C$ may be referred to collectively as provider routers 112. It will be appreciated that MLDP network 110 may include fewer or more than four PE routers $112_E$ or fewer or more PC routers $112_C$. It also will be appreciated that the PE routers $112_E$ and PC routers $112_C$ of MLDP network 110 may be connected in various other configurations.

The MLDP network 110 is configured to support multicast-related communications between MS 120 and UDs 130, where the MS 120 supports a multicast group which is accessible to the UDs 130. The multicast source and multicast group may be referred to herein as a multicast SG.

The multicast-related communications between MS 120 and UDs 130 may include propagation of multicast group management messages between MS 120 and the UDs 130 (e.g., propagation of multicast group join messages when the UDs 130 request to join the multicast group of MS 120, propagation of multicast group leave messages when the UDs 130 request to leave the multicast group of MS 120, and the like).

The multicast-related communications also may include propagation of multicast content from MS 120 toward the UDs 130 while the UDs 130 are members of the multicast group of MS 120. The propagation of multicast content from MS 120 toward the UDs 130 may be supported using LSPs set up within MLDP network 110. The MLDP network 110 supports use of the MLDP for managing the LSPs used to deliver multicast content from MS 120 to the UDs 130. The LSPs may include point-to-multipoint (P2MP) LSPs, multipoint-to-multipoint (MP2MP) LSPs, or the like. In the case of MLDP, the LSPs may be referred to as MLDP tunnels. The set of MLDP tunnels for the multicast group supported by the multicast source MS 120 provides a Multicast Distribution Tree (MDT) for the multicast group supported by MS 120. The MDT for the multicast group supported by MS 120 is rooted at PE $112_{E1}$, and the leaf nodes for the MDT for the multicast group supported by the MS 120 may include any of PEs $112_{E2}$-$112_{E4}$ depending on whether the UDs $130_1$-$130_3$, respectively, are currently members of the multicast group supported by the multicast source MS 120 (e.g., when a UD 130 joins the multicast group an MLDP tunnel is established between the root node PE $112_{E1}$ and the associated PE 112 that is serving that UD 130 and, similarly, when a UD 130 leaves the multicast group an existing MLDP tunnel that is established between the root node PE $112_{E1}$ and the associated PE 112 that is serving that UD 130 is removed).

The MLDP network 110 is configured to support management of the MDT which supports propagation of multicast content from MS 120 toward the UDs 130. The MLDP 110 may be configured to support one or more routing protocols which may be used to advertise routing information between provider routers 112 of MLDP 110. For example, MLDP 110 may support one or more of an Open Shortest Path First (OSPF) protocol, an Intermediate System to Intermediate System (ISIS) protocol, a Border Gateway Protocol (BGP) protocol, or any other suitable routing protocol(s).

The PE routers $112_E$ are configured to facilitate communications between other elements located within the MLDP network 110 (illustratively, PC routers $112_C$) and the elements located outside of MLDP network 110 (illustratively, the ARs 140). The PE routers $112_E$ may be configured to communicate with other elements located within the MLDP network 110 using MLDP or any other suitable protocol(s). The PE routers $112_E$ may be configured to communicate with the elements located outside of the MLDP network 110 using PIM or any other suitable protocol(s). The PE routers $112_E$ also are configured to support one or more routing protocols which may be used to advertise routing information within MLDP 110 (e.g., OSPF, ISIS, BGP, or the like). Thus, in at least one embodiment, one or more of the PE routers 112 includes a PIM module configured to support the PIM protocol, an MLDP module configured to support the MLDP protocol, and one or more routing protocol modules configured to support one or more routing protocols. This is illustrated in FIG. 1 with respect to PE router $112_{E1}$ (illustratively, PIM module $114_{E1}$, MLDP module $115_{E1}$, and routing protocol module $116_{E1}$) and PE router $112_{E3}$ (illustratively, PIM module $114_{E3}$, MLDP module $115_{E3}$, and routing protocol module $116_{E3}$), but also may be supported by any or all of the other PE routers $112_{E1}$ of MLDP network 110. As further depicted in FIG. 1, root node PE $112_{E1}$ also includes an outgoing interface list $117_{E1}$ for the multicast SG of MS 120, which is a list of outgoing interfaces of root node PE $112_{E1}$ to which multicast packets belonging to the multicast SG of MS 120 are sent (namely, a list of outgoing interfaces to which multicast packets for the multicast SG (S1,G1) are sent).

The PC routers $112_C$ are configured to facilitate communications between elements located within the MLDP network 110 (illustratively, PE routers $112_E$). The PC routers $112_C$ may be configured to communicate between elements located within the MLDP network 110 using MLDP or any other suitable protocol(s). The PC routers $112_C$ also are configured to support one or more routing protocols which may be used to advertise routing information within MLDP 110 (e.g., OSPF, ISIS, BGP, or the like).

The MS 120 is configured to support a multicast group accessible to the UDs 130. The MS 120 accesses MLDP network 110 via PE router $112_{E1}$ and, thus, PE router $112_{E1}$ operates as the root node for the MDT used to deliver multicast content of the multicast group to the UDs 130. The MS 120 is configured to support multicast group membership management (e.g., processing requests by the UDs 130 to join the multicast group, processing requests by the UDs 130 to leave the multicast group, or the like). The MS 120 is configured to operate as a source of multicast content which may be distributed to the multicast group via the MDT within MLDP network 110. The MS 120 may store or otherwise access content which may be distributed to the multicast group via MLDP network 110. The MS 120 may be referred to herein as multicast source S1 and the multicast group supported by MS 120 may be referred to herein as multicast group G1, such that the multicast group on MS 120 may be referred to herein using a designation of (S1,G1). The combination of the multicast source (S1) and the multicast group (G1) may be referred to herein as a multicast source and group (multicast SG). It will be appreciated that MS 120 may support one or more other multicast groups in addition to the (S1,G1) multicast SG primarily depicted and described herein.

The UDs 130 are configured to participate in the multicast group provided by MS 120. The UDs 130 are configured to initiate requests to join the multicast group of MS 120 and to initiate requests to leave the multicast group of MS 120. The UDs 130 may be configured to initiate multicast group join and leave requests using the Internet Group Management Protocol (IGMP) protocol or any other suitable protocol(s). The UDs 130 also are configured to receive and handle multicast content provided by MS 120 for the multicast group. The handling of the multicast content by the UDs 130 may include one or more of storage of the multicast content, presentation of the multicast content via one or more presentation interfaces, further propagation of the multicast content, or the like, as well as various combinations thereof. For example, the user devices 130 may include desktop computers, laptop computers, tablet computers, smartphones, set-top boxes, televisions, or the like.

The ARs 140 are configured to facilitate communications between elements located within the MLDP network 110 (illustratively, PE routers $112_E$) and the elements located outside of MLDP network 110 (illustratively, MS 120 and UDs 130). The ARs 140 may be configured to communicate with the elements located within the MLDP network 110 using the Protocol Independent Multicast (PIM) protocol or any other suitable protocol(s). The ARs 140 may be configured to communicate with the elements located outside of the MLDP network 110 using IGMP or any other suitable protocol(s).

The communication system 100 may be configured to support one or more features related to providing multicast group management in support of delivery of content from multicast server 120 to user devices 130 via MLDP-based network 110. The one or more features are depicted and described with respect to FIGS. 2-4.

Figure 2:
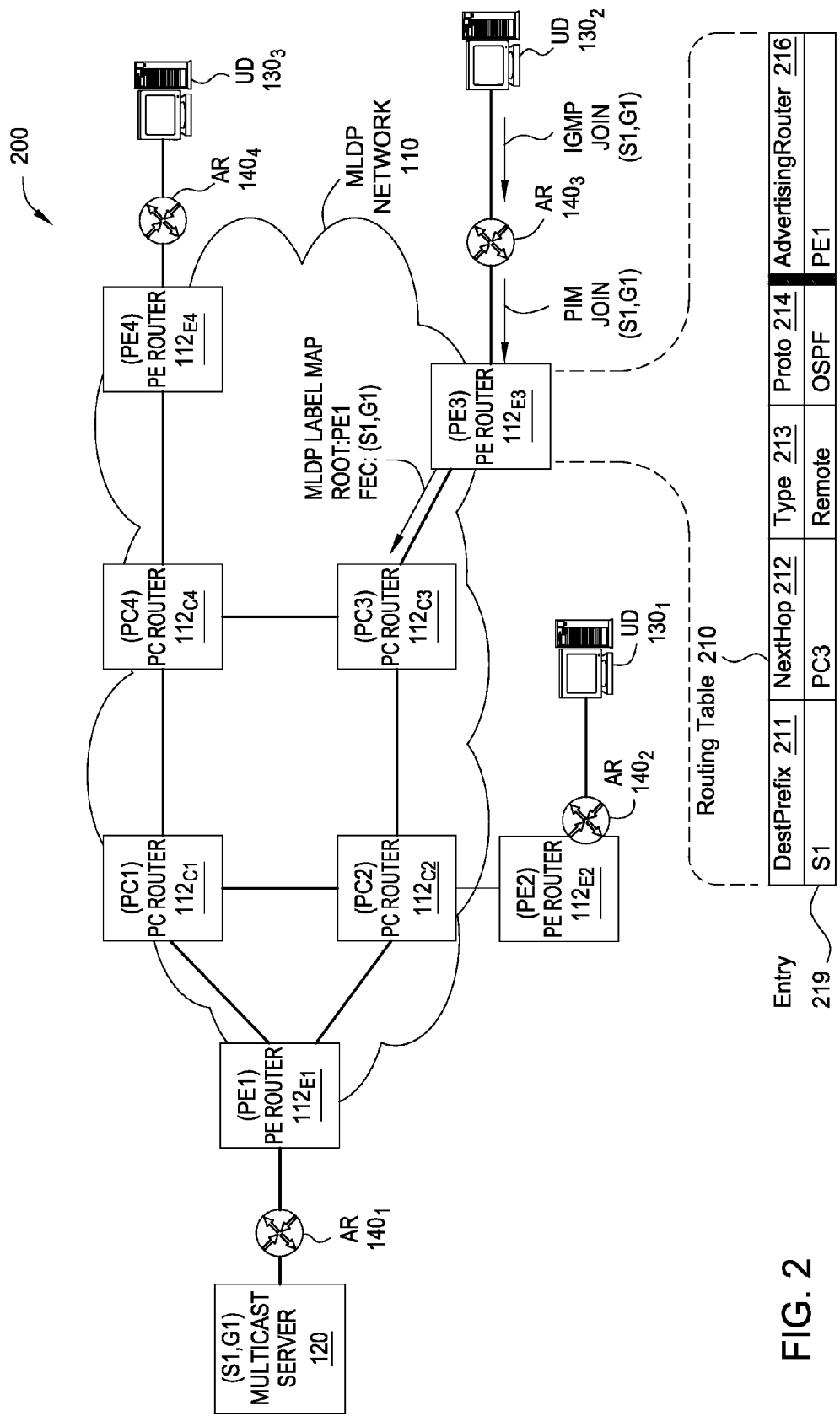
FIG. 2 depicts the communication system of FIG. 1, illustrating an embodiment for determining the root node of an MLDP tunnel for a multicast SG.

FIG. 2 depicts the communication system of FIG. 1, illustrating an embodiment for determining the root node of an MLDP tunnel for a multicast SG. It will be appreciated that, although primarily depicted and described within the context of a network flow, the various features and functions depicted and described herein may be implemented as one or more processes configured to execute on one or more elements of the system of FIG. 2.

The UD $130_2$ sends an IGMP multicast group join request (denoted as IGMP JOIN) in which the UD $130_2$ requests to join the multicast group on MS 120 (denoted herein as multicast SG (S1,G1)). The IGMP JOIN includes information identifying the multicast group that UD $130_2$ is requesting to join (denoted as group G1) and the multicast source MS 120 which supports the multicast group that UD $130_2$ is requesting to join (denoted as source S1), which may be referred to herein as information identifying the multicast SG (S1,G1).

The AR $140_3$ receives the IGMP JOIN from UD $130_2$, converts the IGMP JOIN into a PIM multicast group join request (denoted as PIM JOIN), and propagates the PIM JOIN toward the PE router $112_{E3}$ (which will be the leaf node of the MLDP tunnel). The PIM JOIN, like the IGMP JOIN, includes information identifying the multicast group that UD $130_2$ is requesting to join (denoted as group G1) and the multicast source MS 120 which supports the multicast group that UD $130_2$ is requesting to join (denoted as source S1), which, again may be referred to herein as information identifying the multicast SG (S1,G1).

The PE router $112_{E3}$ receives the PIM JOIN from the AR $140_3$, identifies a node which will be the root of an MLDP tunnel to be established within MLDP network 110 in response to the PIM JOIN. The PE router $112_{E3}$ establishes an MLDP-PIM binding and initiates establishment of the MLDP tunnel between the root node and PE router $112_{E3}$.

The PE router $112_{E3}$ determines the node which will be the root of the MLDP tunnel to be established within MLDP network 110 by identifying an advertising node which advertised the route to reach the multicast source that is identified in the PIM JOIN. The MLDP tunnel is established with that advertising node as the root node termination point of the MLDP tunnel and the PE router $112_{E3}$ as the leaf node termination point of the MLDP tunnel.

The PE router $112_{E3}$ identifies the advertising node, which advertised the route to reach the multicast source that is identified in the PIM JOIN, based on a routing table available to PE router $112_{E3}$. An exemplary routing table 210 of PE router $112_{E3}$, including an exemplary routing table entry 219, is depicted in FIG. 2.

The exemplary routing table 210 includes a Destination Prefix field 211 (denoted as DestPrefix) which identifies a source (e.g., using an address prefix), a Next-Hop node field 212 (denoted as NextHop) which identifies a next-hop node on the route to reach the multicast source from PE router $112_{E3}$, a Type field 213 (denoted as Type) which indicates a type of the route (e.g., remotely-connected, directly-connected, or locally-originated), and a Protocol field 214 (denoted as Proto) which identifies the routing protocol used to learn the route within MLDP network 110. It will be appreciated that, although the exemplary routing table 210 also is depicted as including an Advertising Router field 215 (denoted as AdvertisingRouter), which identifies the node that advertised to the next-hop node the route to reach the source, the Advertising Router field 215 represents an opaque field of the exemplary routing table 210 in the sense that the advertising node is identified via querying of the routing protocol identified in the Protocol field 214 before the advertising node may be associated with that route of the exemplary routing table 210.

The exemplary routing table entry 219 specifies the route to reach the source that is identified in the PIM JOIN. The exemplary routing table entry 219 includes: a value of "S1" (an identifier of MS 120, which is the source of the multicast group (G1) for which the PIM JOIN is received) in Destination Prefix field 211, a value of "PC3" (an indication that the next hop on the path from PE router $112_{E3}$ toward MS 120 is PC router $112_{C3}$) in the Next-Hop node field 212, a value of "Remote" (an indication that the route is a remotely-connected route) in the Type field 213, a value of "OSPF" (an indication that the OSPF protocol was used to advertise the route within MLDP network 110) in the Protocol field 214, and a value of "PE1" (an indication that PE router $112_{E1}$ advertised the route of exemplary routing table entry 219) in the Advertising Router field 215.

The PIM module $114_{E3}$ of PE router $112_{E3}$ queries exemplary routing table 210 of PE router $112_{E3}$, using the identifier of the source from the PIM JOIN (illustratively, S1) as a key, in order to identify the exemplary routing table entry 219 that is associated with the route to reach MS 120 from PE router $112_{E3}$.

The PIM module $114_{E3}$ of PE router $112_{E3}$ determines, from exemplary routing table entry 219, a next-hop node on the route to reach the multicast source from router $112_{E3}$ and a routing protocol that was used to advertise the route to reach the multicast source from router $112_{E3}$. As described above, exemplary routing table entry 219 indicates that next-hop node on the route to reach the multicast source from router $112_{E3}$ is PC router $112_{C3}$ and that the OSPF routing protocol was used to advertise the route to reach the multicast source from router $112_{E3}$.

The PIM module $114_{E3}$, based on a determination that the OSPF routing protocol was used to advertise the route to reach the multicast source from router $112_{E3}$, queries the OSPF routing protocol in order to identify the advertising node which advertised, to the next-hop node, the route to reach the multicast source MS 120. The PIM module $114_{E3}$ queries the OSPF routing protocol using an opaque identifier of the next-hop node (illustratively, an identifier of PC router $112_{C3}$) as a key. The result of the query to the OSPF routing protocol is the identity of the advertising node which advertised, to the next-hop node, the route to reach the multicast source (illustratively, an identifier of PE router $112_{E1}$).

The PIM module $114_{E3}$ encodes the multicast SG information into an MLDP Forwarding Equivalence Class (FEC) and initiates a request to the MLDP module $115_{E3}$ of PE router $112_{E3}$ for the MLDP module $115_{E3}$ to establish an MLDP tunnel between PE router $112_{E3}$ and the advertising node (illustratively, PE router $112_{E1}$) based on the MLDP FEC. The PIM module $114_{E3}$ provides the MLDP FEC and an identifier of the advertising node (illustratively, an identifier of PE router $112_{E1}$) to the MLDP module $115_{E3}$ for use in establishing the MLDP tunnel between PE router $112_{E3}$ and PE router $112_{E1}$.

The MLDP module $115_{E3}$ initiates establishment of the MLDP tunnel between PE router $112_{E3}$ and PE router $112_{E1}$ and propagates the encoded MLDP FEC toward the advertising node (illustratively, PE router $112_{E1}$). The advertising node is the root node of the MLDP tunnel to be established responsive to the request to join the multicast SG.

Figure 3:
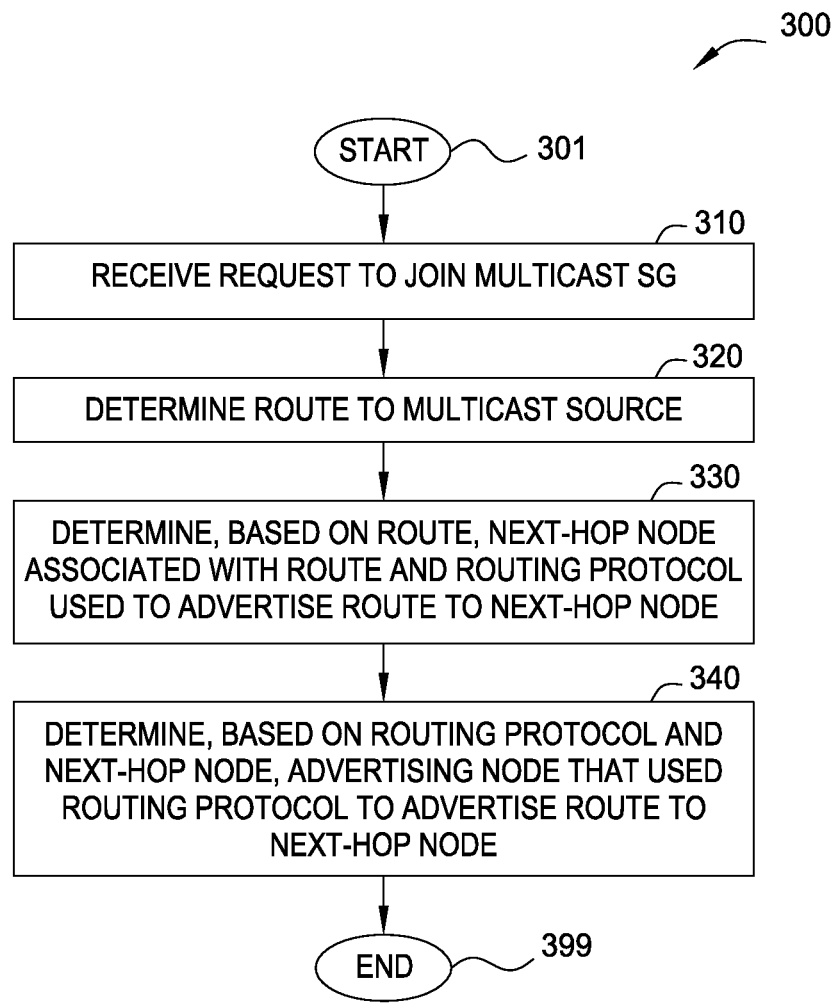
FIG. 3 depicts one embodiment of a method for determining the root node of an MLDP tunnel for a multicast SG.

FIG. 3 depicts one embodiment of a method for determining the root node of an MLDP tunnel for a multicast SG. As described with respect to FIG. 2, the root node of an MLDP tunnel for a multicast SG is the node that advertised to the next-hop node the route to reach the source of the multicast SG. It will be appreciated that, although primarily depicted and described as being performed serially, at least a portion of the steps of method 300 may be performed contemporaneously or in a different order than presented in FIG. 3.

At step 301, method 300 begins.

At step 310, a request to join a multicast SG is received. The request may be a PIM JOIN for a multicast SG. The request includes information identifying the multicast SG.

At step 320, a route to the multicast source is determined. The route to the multicast source may be determined from a routing table based on an identifier of the multicast source.

At step 330, a next-hop node associated with the route to the multicast source and a routing protocol used to advertise to the next-hop node the route to the multicast source are determined based on the route to the multicast source. The route to the multicast source may be specified as a routing table entry such that the next-hop node associated with the route to the multicast source and the routing protocol used to advertise to the next-hop node the route to the multicast source may be determined from fields of the routing table entry.

At step 340, an advertising node, that used the routing protocol to advertise to the next-hop node the route to the multicast source, is determined based on the routing protocol and the next-hop node. The advertising node may be determined by querying the routing protocol based on an identifier of the next-hop node. The advertising node is the root node of a tunnel to be established responsive to the request to join the multicast SG (e.g., an MLDP tunnel responsive to a PIM JOIN).

At step 399, method 300 ends.

In at least some embodiments, processing of an encoded MLDP FEC at the root node of an MLDP tunnel (e.g., for a multicast SG join as depicted and described with respect to FIGS. 2-3 or for a multicast SG prune) may be performed as depicted and described with respect to FIGS. 4-8.

Figure 4:
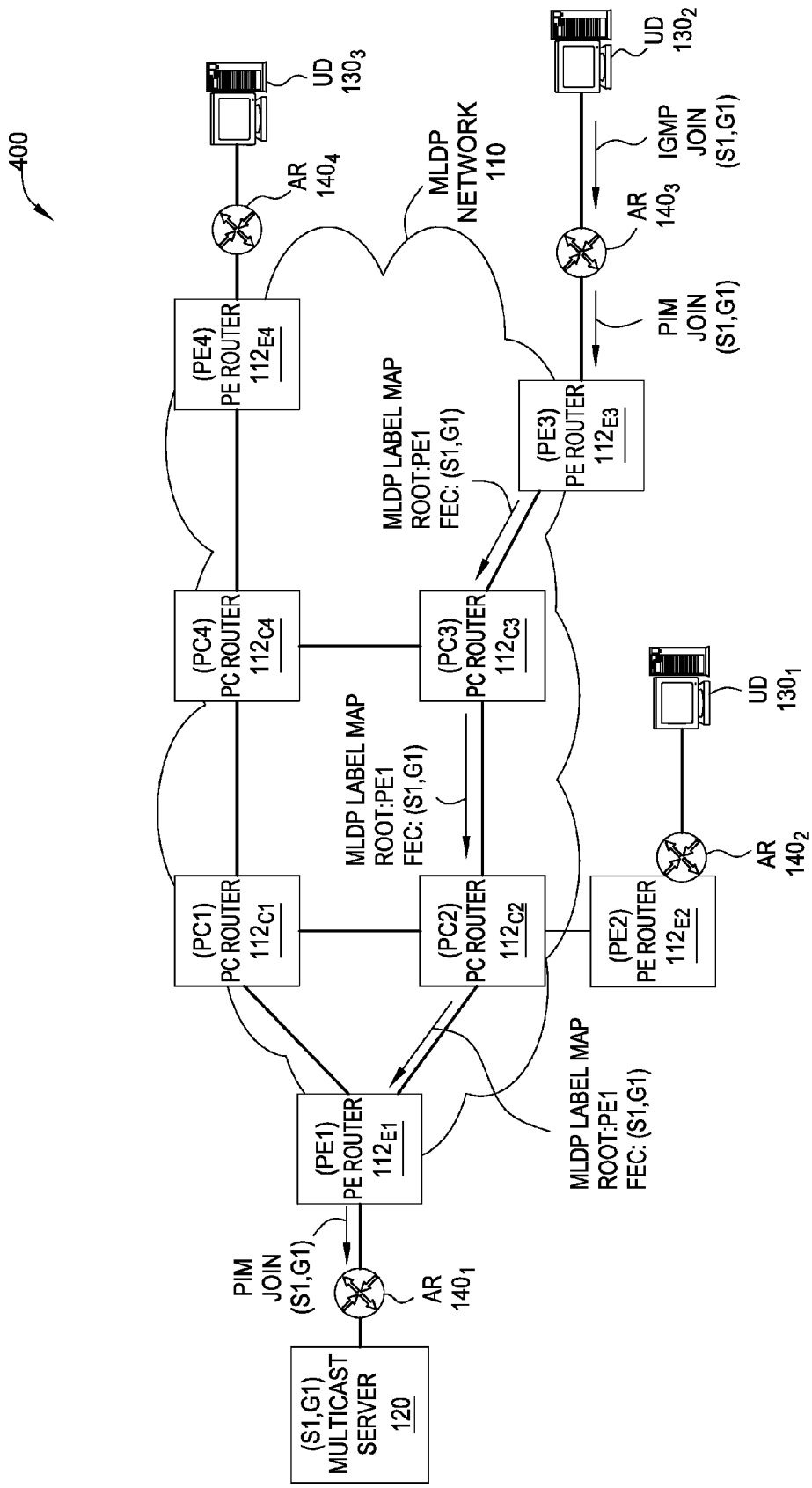
FIG. 4 depicts the communication system of FIG. 1 and FIG. 2, illustrating an embodiment for establishing an MLDP PIM binding at the root node of an MLDP tunnel.

FIG. 4 depicts the communication system of FIG. 1 and FIG. 2, illustrating an embodiment for establishing an MLDP PIM binding at the root node of an MLDP tunnel. It will be appreciated that, although primarily depicted and described within the context of a network flow, the various features and functions depicted and described herein may be implemented as one or more processes configured to execute on one or more elements of the system of FIG. 4.

The PE router $112_{E1}$ receives an MLDP tunnel creation request message. The MLDP tunnel creation request message is received from PE router $112_{E3}$ via PC router $112_{C3}$ and PC router $112_{C2}$. The propagation of the MLDP tunnel creation request message from PE router $112_{E3}$ toward PE router $112_{E1}$ may be initiated as depicted and described with respect to FIG. 2. The MLDP tunnel creation request message includes an encoded MLDP FEC which includes encoded multicast SG information for the multicast group of MS 120 (namely, for multicast SG (S1,G1)).

The PE router $112_{E1}$ is configured to translate from MLDP back to PIM using an IGMP local membership at the PE router $112_{E1}$.

The MLDP module $115_{E1}$ of PE router $112_{E1}$ detects creation of the MLDP tunnel for the multicast SG. The MLDP module $115_{E1}$ may detect creation of the MLDP tunnel for the multicast SG based on receipt of the MLDP tunnel creation request message with the encoded MLDP FEC.

The MLDP module $115_{E1}$ propagates an indication of creation of the MLDP tunnel to the PIM module $114_{E1}$ of PE router $112_{E1}$. The MLDP module $115_{E1}$ provides the encoded multicast SG information (encoded version of (S1,G1)) from the encoded MLDP FEC to the PIM module $114_{E1}$, which may be provided in conjunction with or independent of the indication of creation of the MLDP tunnel that is propagated from the MLDP module $115_{E1}$ to the PIM module $114_{E1}$.

The PIM module $114_{E1}$ decodes the encoded multicast SG information (encoded version of (S1,G1)) from the MLDP FEC to recover the multicast SG information (S1,G1) and adds the MLDP tunnel in an outgoing interface list of the multicast SG (namely, for (S1,G1)) by faking an IGMP local membership join for the multicast SG (again for (S1,G1)) on the MLDP tunnel. The IGMP local membership join for the multicast SG is "fake" in the sense that the PIM module $114_{E1}$ sends the IGMP membership join for the multicast SG to itself (rather than using a typical operation in which the PIM module $114_{E1}$ would receive an IGMP membership join from an IGMP module of PE router $112_{E1}$). The IGMP local membership join for the multicast SG is "local" in the sense that the associated membership information is localized to PIM (e.g., to PIM module $114_{E1}$) and does not impact the IGMP module of PE router $112_{E1}$.

The PIM module $114_{E1}$ designates itself as the Designated Router (DR) for the MLDP tunnel. The PIM module $114_{E1}$ propagates a PIM multicast group join request (denoted as PIM JOIN) upstream toward the multicast source (illustratively, MS 120). The PIM JOIN includes the multicast SG information (S1,G1) for use by the MS 120 to enable the UD $130_2$ to join the multicast group G1 available from MS 120.

The AR $140_1$ receives the PIM JOIN from the PE router $112_{E1}$, and processes the PIM JOIN for enabling the UD $130_2$ to join the multicast group G1 available from MS 120. The UD $130_2$, after becoming a member of the multicast group G1 available from MS 120, may start receiving multicast content from MS 120 via MLDP network 110.

Figure 5:
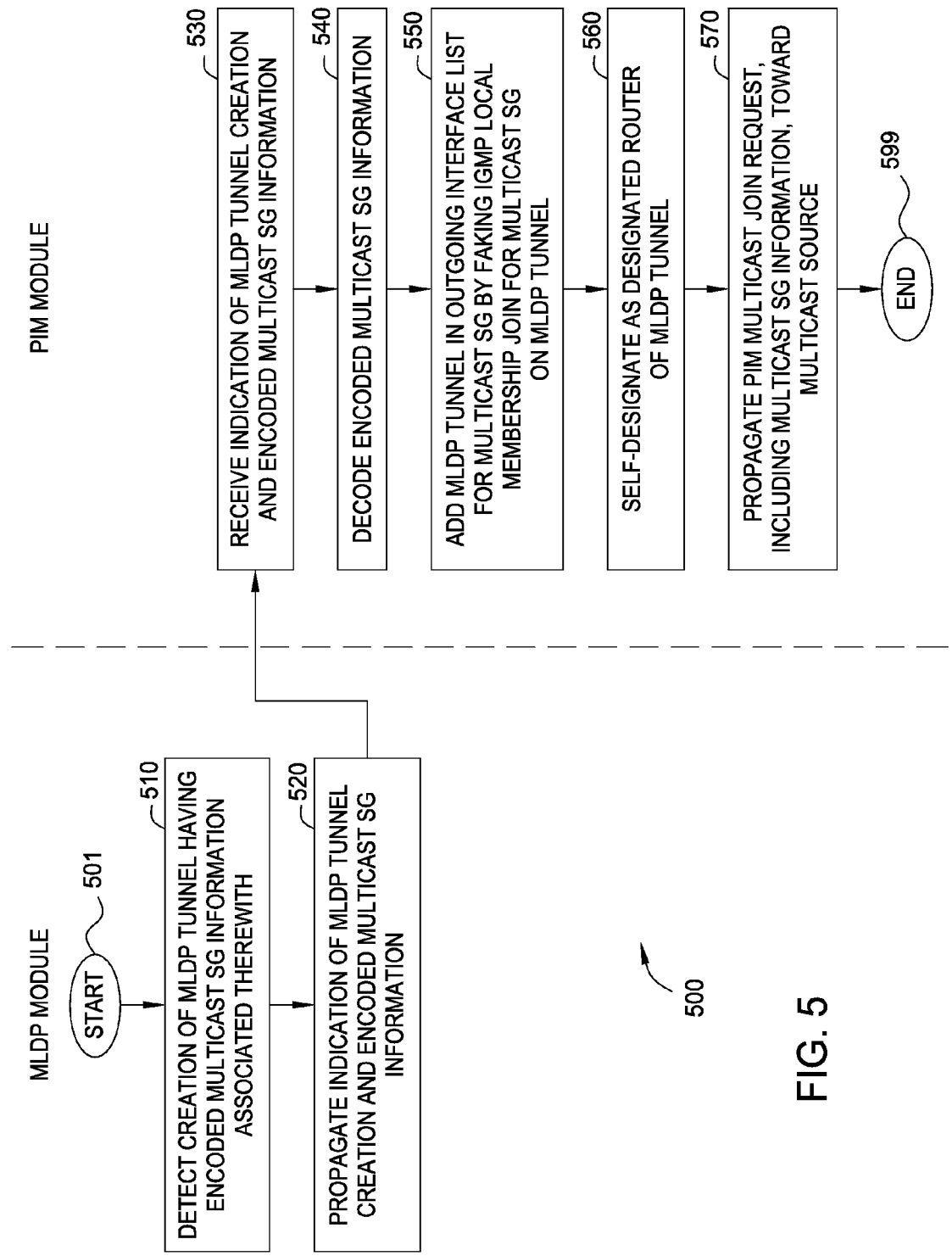
FIG. 5 depicts one embodiment of a method for establishing an MLDP PIM binding at the root node of an MLDP tunnel.

FIG. 5 depicts one embodiment of a method for establishing an MLDP PIM binding at the root node of an MLDP tunnel. As depicted in FIG. 5, method 500 is performed by a router where a portion of the steps of method 500 are performed by an MLDP module of the router and a portion of the steps of method 500 are performed by a PIM module of the router. It will be appreciated that, although primarily depicted and described as being performed serially, at least a portion of the steps of method 500 may be performed contemporaneously or in a different order than presented in FIG. 5.

At step 501, method 500 begins.

At step 510, the MLDP module detects creation of an MLDP tunnel having multicast SG information associated therewith.

At step 520, the MLDP module propagates an indication of creation of the MLDP tunnel, and encoded multicast SG information associated with creation of the MLDP tunnel, toward the PIM module.

At step 530, the PIM module receives the indication of creation of the MLDP tunnel, and the encoded multicast SG information associated with creation of the MLDP tunnel, from the MLDP module.

At step 540, the PIM module decodes the encoded multicast SG information.

At step 550, the PIM module adds the MLDP tunnel in an outgoing interface list of the multicast SG by faking an IGMP local membership join for the multicast SG on the MLDP tunnel.

At step 560, the PIM module designates itself as the Designated Router (DR) of the MLDP tunnel.

At step 570, the PIM module propagates a PIM JOIN, including the multicast SG information, toward the multicast source.

At step 599, method 500 ends.

Figure 6:
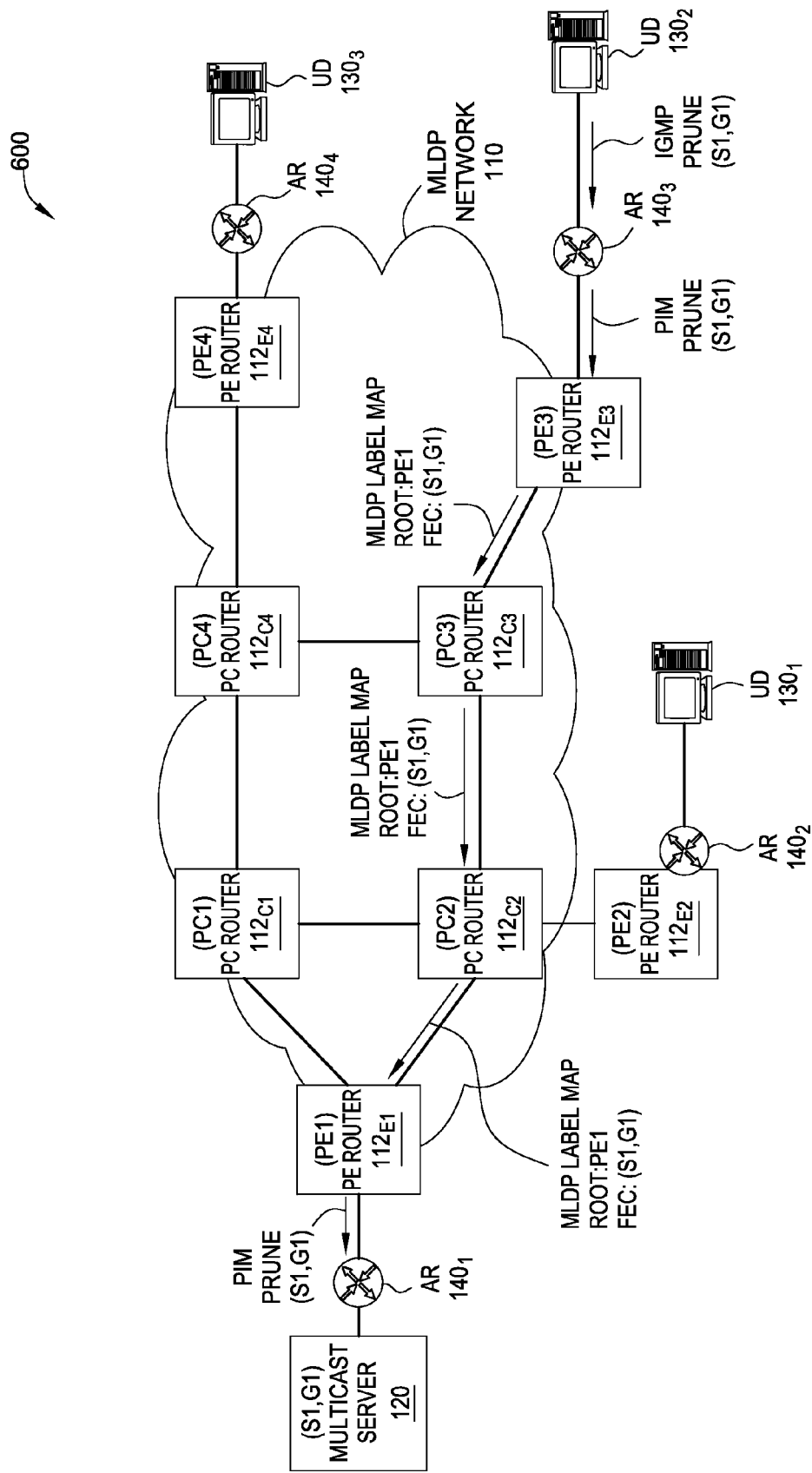
FIG. 6 depicts the communication system of FIG. 1 and FIG. 2, illustrating an embodiment for removing an MLDP PIM binding at the root node of an MLDP tunnel.

FIG. 6 depicts the communication system of FIG. 1 and FIG. 2, illustrating an embodiment for removing an MLDP PIM binding at the root node of an MLDP tunnel. It will be appreciated that, although primarily depicted and described within the context of a network flow, the various features and functions depicted and described herein may be implemented as one or more processes configured to execute on one or more elements of the system of FIG. 6.

The removal of an MLDP PIM binding at the root node of an MLDP tunnel, as depicted and described with respect to FIG. 6, is complementary to the creation of an MLDP PIM binding at the root node of an MLDP tunnel as depicted and described with respect to FIG. 2 and FIG. 4 (although the MLDP tunnel already exists and the root node of the MLDP tunnel is already known).

The UD $130_2$ sends an IGMP multicast group leave request (denoted as IGMP PRUNE) in which the UD $130_2$ requests to leave the multicast group on MS 120 (denoted as multicast SG (S1,G1)). The IGMP PRUNE includes information identifying the multicast group that UD $130_2$ is requesting to leave (denoted as group G1) and the multicast source MS 120 which supports the multicast group that UD $130_2$ is requesting to leave (denoted as source S1), which may be referred to herein as information identifying the multicast SG (S1,G1).

The AR $140_3$ receives the IGMP PRUNE from UD $130_2$, converts the IGMP PRUNE into a PIM multicast group leave request (denoted as PIM PRUNE), and propagates the PIM PRUNE toward the PE router $112_{E3}$. The PIM PRUNE, like the IGMP PRUNE, includes information identifying the multicast group that UD $130_2$ is requesting to leave (denoted as group G1) and the multicast source MS 120 which supports the multicast group that UD $130_2$ is requesting to leave (denoted as source S1), which, again, may be referred to herein as information identifying the multicast SG (S1,G1).

The PIM module $114_{E3}$ of PE router $112_{E3}$ receives the PIM PRUNE from the AR $140_3$. The PIM module $114_{E3}$ determines whether or not to remove the MLDP PIM binding (which may be based on one or more factors). Here, for purposes of clarity, an assumption is made that the PIM module $114_{E3}$ determines that the MLDP PIM binding is to be removed.

The PIM module $114_{E3}$ encodes the multicast SG information into an MLDP Forwarding Equivalence Class (FEC) and initiates a request to the MLDP module $115_{E3}$ of PE router $112_{E3}$ for the MLDP module $115_{E3}$ to remove the MLDP tunnel from PE router $112_{E3}$ to the advertising node (illustratively, PE router $112_{E1}$) based on the MLDP FEC. The PIM module $114_{E3}$ provides the MLDP FEC and an identifier of the root node (illustratively, an identifier of PE router $112_{E1}$) to the MLDP module $115_{E3}$ for use in removing the MLDP tunnel between PE router $112_{E3}$ and PE router $112_{E1}$. The MLDP module $115_{E3}$ initiates removal of the MLDP tunnel between PE router $112_{E3}$ and PE router $112_{E1}$ and propagates an MLDP tunnel removal request message, including the encoded MLDP FEC, toward the root node (illustratively, PE router $112_{E1}$).

The MLDP network 110 routes the encoded MLDP FEC from PE router $112_{E3}$ to PE router $112_{E1}$ via PC router $112_{C3}$ and PC router $112_{C2}$.

The PE router $112_{E1}$ receives the MLDP tunnel removal request message including the encoded MLDP FEC (which includes encoded multicast SG information for the multicast SG (namely, for the multicast group of MS 120, i.e. for (S1,G1)).

The PE router $112_{E1}$ is configured to translate from MLDP back to PIM using an IGMP local membership at the PE router $112_{E1}$.

The MLDP module $115_{E1}$ of PE router $112_{E1}$ detects removal of the MLDP tunnel for the multicast SG. The MLDP module $115_{E1}$ may detect removal of the MLDP tunnel for the multicast SG based on receipt of the MLDP tunnel removal request message with an encoded MLDP FEC.

The MLDP module $115_{E1}$ propagates an indication of removal of the MLDP tunnel to the PIM module $114_{E1}$ of PE router $112_{E1}$. The MLDP module $115_{E1}$ provides the encoded multicast SG information (encoded version of (S1,G1)) from the encoded MLDP FEC to the PIM module $114_{E1}$, which may be provided in conjunction with or independent of the indication of removal of the MLDP tunnel that is propagated from the MLDP module $115_{E1}$ to the PIM module $114_{E1}$.

The PIM module $114_{E1}$ decodes the encoded multicast SG information (encoded version of (S1,G1)) from the MLDP FEC to recover the multicast SG information (S1,G1) and removes the MLDP tunnel from an outgoing interface list of the multicast SG (namely, for (S1,G1)) by faking an IGMP local membership leave (prune) for the multicast SG (again for (S1,G1)) on the MLDP tunnel. The IGMP local membership leave for the multicast SG is "fake" in the sense that the PIM module $114_{E1}$ sends the IGMP membership leave for the multicast SG to itself (rather than typical operation in which the PIM module $114_{E1}$ would receive an IGMP membership leave from an IGMP module of PE router $112_{E1}$). The IGMP local membership leave for the multicast SG is "local" in the sense that the associated membership information is localized to PIM (e.g., to PIM module $114_{E1}$) and does not impact the IGMP module of PE router $112_{E1}$.

The PIM module $114_{E1}$ is already designated as the Designated Router (DR) for the MLDP tunnel. The PIM module $114_{E1}$ propagates a PIM PRUNE upstream toward the multicast source (illustratively, MS 120). The PIM PRUNE includes the multicast SG information (S1,G1) for use by the MS 120 to remove the UD $130_2$ from the multicast group G1 of MS 120.

The AR $140_1$ receives the PIM PRUNE from the PE router $112_{E1}$, and processes the PIM PRUNE for enabling the UD $130_2$ to leave the multicast group G1 of MS 120. The UD $130_2$, after leaving the multicast group G1 of MS 120, no longer receives multicast content from MS 120 via MLDP network 110.

Figure 7:
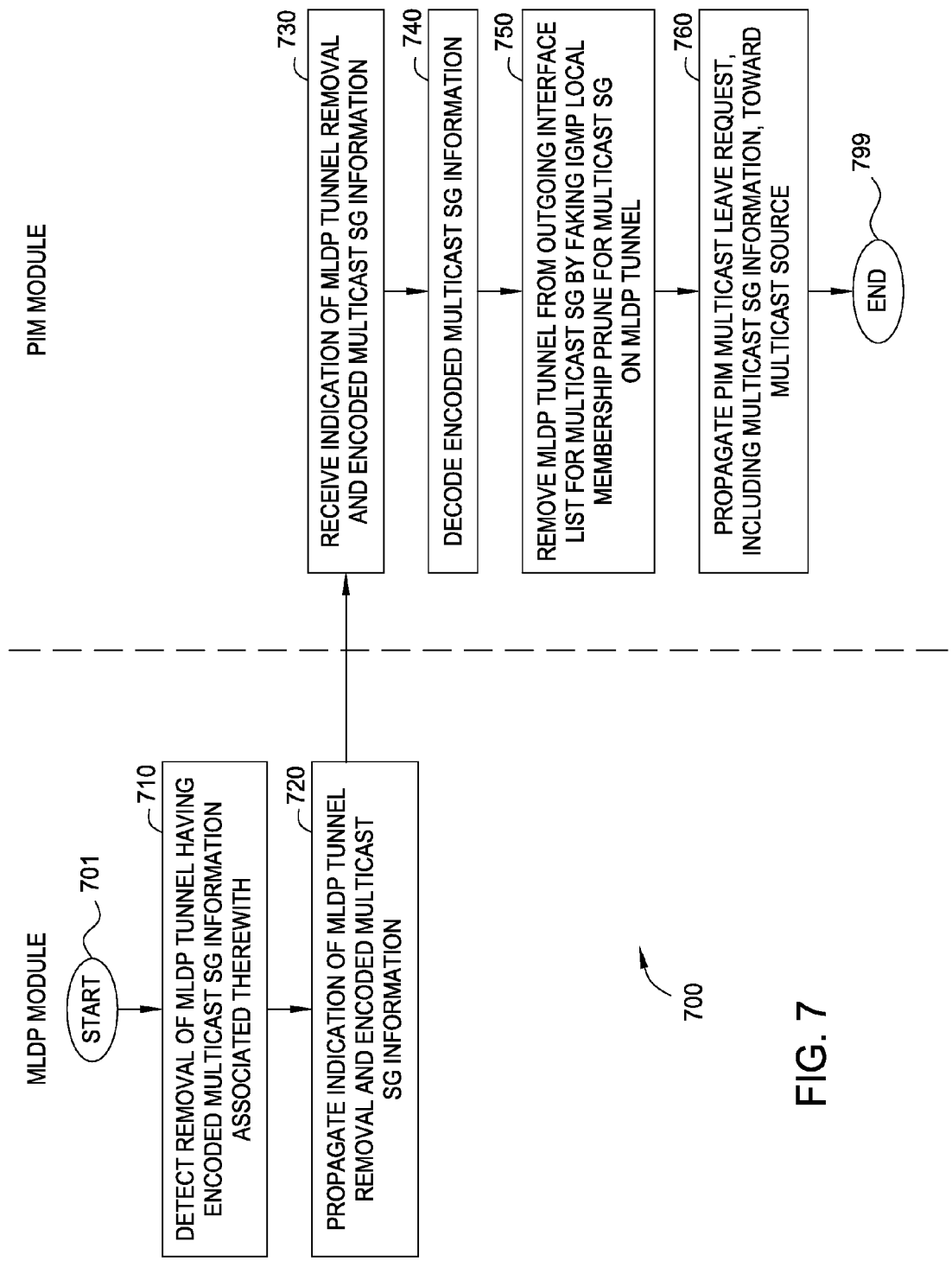
FIG. 7 depicts one embodiment of a method for removing an MLDP PIM binding at the root node of an MLDP tunnel.

FIG. 7 depicts one embodiment of a method for removing an MLDP PIM binding at the root node of an MLDP tunnel. As depicted in FIG. 7, method 500 is performed by a router where a portion of the steps of method 700 are performed by an MLDP module of the router and a portion of the steps of method 700 are performed by a PIM module of the router. It will be appreciated that, although primarily depicted and described as being performed serially, at least a portion of the steps of method 700 may be performed contemporaneously or in a different order than presented in FIG. 7.

At step 701, method 700 begins.

At step 710, the MLDP module detects removal of an MLDP tunnel having multicast SG information associated therewith.

At step 720, the MLDP module propagates an indication of removal of the MLDP tunnel, and encoded multicast SG information associated with removal of the MLDP tunnel, toward the PIM module.

At step 730, the PIM module receives the indication of removal of the MLDP tunnel, and the encoded multicast SG information associated with removal of the MLDP tunnel, from the MLDP module.

At step 740, the PIM module decodes the encoded multicast SG information.

At step 750, the PIM module removes the MLDP tunnel from an outgoing interface list of the multicast SG by faking an IGMP local membership leave (prune) for the multicast SG on the MLDP tunnel.

At step 760, the PIM module propagates a PIM PRUNE, including the multicast SG information, toward the multicast source.

At step 799, method 700 ends.

As described herein with respect to FIGS. 4-7, a router may be configured to create an MLDP PIM binding in response to creation of an MLDP tunnel based on a request to join a multicast group and to remove an MLDP PIM binding in response to removal of an MLDP tunnel based on a request to leave a multicast group. Thus, with respect to MLDP PIM binding, a router may be configured to adjusting (e.g., create or remove) an MLDP PIM binding at the root node of an MLDP tunnel based on a multicast group membership request (e.g., a request to join or leave the multicast group). An exemplary embodiment is depicted and described with respect to FIG. 8.

Figure 8:
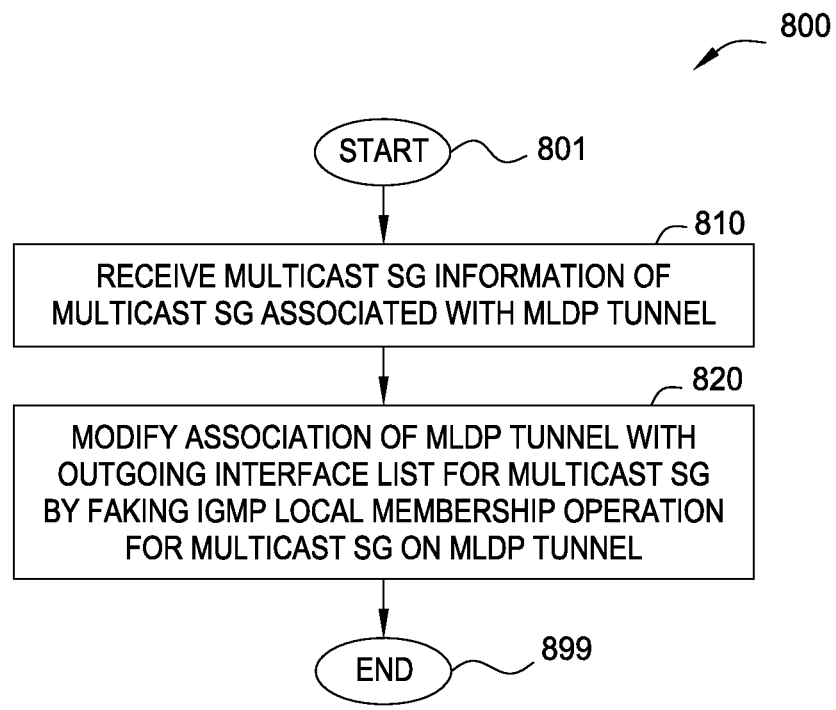
FIG. 8 depicts one embodiment of a method for adjusting an MLDP PIM binding at the root node of an MLDP tunnel.

FIG. 8 depicts one embodiment of a method for adjusting an MLDP PIM binding at the root node of an MLDP tunnel. It will be appreciated that, although primarily depicted and described as being performed serially, at least a portion of the steps of method 800 may be performed contemporaneously or in a different order than presented in FIG. 8.

At step 801, method 800 begins. At step 810, multicast SG information associated with an MLDP tunnel is received. At step 820, association of the MLDP tunnel with an outgoing interface list for the multicast SG is modified by faking an IGMP local membership operation for the multicast SG on the MLDP tunnel. In the case of creation of an MLDP tunnel for the multicast SG, the MLDP tunnel is added to an outgoing interface list of the multicast SG by faking an IGMP local membership join operation for the multicast SG on the MLDP tunnel. In the case of removal of an MLDP tunnel for the multicast SG, the MLDP tunnel is removed from an outgoing interface list of the multicast SG by faking an IGMP local membership leave operation for the multicast SG on the MLDP tunnel. At step 899, method 800 ends.

It will be appreciated that, although primarily depicted and described herein with respect to embodiments configured for use with Source Specific Multicast (SSM) services (e.g., in which a host identifies a multicast data stream in a multicast join/prune message by a multicast source (S) and multicast group (G) address pair (S, G)), various embodiments depicted and described herein may be configured for use with Any-Source Multicast (ASM) services (e.g., in which a host identifies a multicast data stream multicast join/prune message by a multicast rendezvous point (RP) and multicast group (G) address pair (*,G)).

Figure 9:
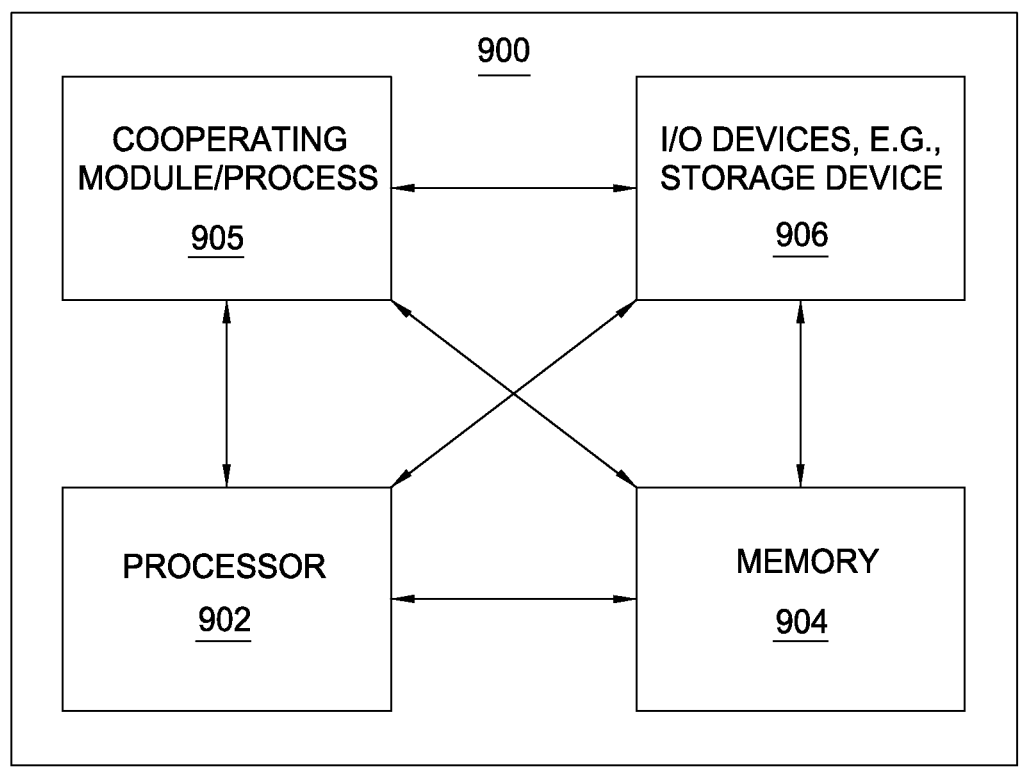
FIG. 9 depicts a high-level block diagram of a computer suitable for use in performing functions described herein.

FIG. 9 depicts a high-level block diagram of a computer suitable for use in performing functions described herein.

The computer 900 includes a processor 902 (e.g., a central processing unit (CPU) or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein or portions of functional elements described herein. For example, the computer 900 provides a general architecture and functionality suitable for implementing one or more of a provider router 112, a portion of a provider router 112 (e.g., a PIM module 113 of a provider router 112, an MLDP module of a provider router 112, a routing protocol module 116 of a provider router, or the like, as well as various combinations thereof), MS 120, a portion of MS 120, a UD 130, a portion of a UD 130, an AR 140, a portion of an AR 140, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents or suitable types of hardware, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in a tangible and non-transitory computer-readable storage medium, such as in fixed or removable media, within a memory within a computing device operating according to the instructions, or the like.

It will be appreciated that the term "or" as used herein refers to a non-exclusive "or" unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
a processor and a memory communicatively connected to the processor, the processor configured to:
receive information associated with a multicast source and multicast group (multicast SG) that is associated with a Multicast Label Distribution Protocol (MLDP) tunnel; and
modify association of the MLDP tunnel with an outgoing interface list of the multicast SG by faking an Internet Group Management Protocol (IGMP) local membership operation for the multicast SG on the MLDP tunnel.

2. The apparatus of claim 1, wherein the processor is configured to support an MLDP module supporting the MLDP and a Protocol Independent Multicast (PIM) module supporting a PIM protocol.

3. The apparatus of claim 2, wherein the MLDP module is configured to:
detect creation or removal of the MLDP tunnel;
extract, from an MLDP Forwarding Equivalence Class (FEC), an encoded version of the information associated with the multicast SG; and
propagate, toward the PIM module, the encoded version of the information associated with the multicast SG.

4. The apparatus of claim 2, wherein the PIM module is configured to:
receive, from the MLDP module, an encoded version of the information associated with the multicast SG;
decode the encoded version of the information associated with the multicast SG; and
identify the multicast SG based on the information associated with the multicast SG.

5. The apparatus of claim 1, wherein the processor is configured to:
detect creation or removal of the MLDP tunnel;
extract, from an MLDP Forwarding Equivalence Class (FEC), an encoded version of the information associated with the multicast SG;
decode the encoded version of the information associated with the multicast SG; and
identify the multicast SG based on the information associated with the multicast SG.

6. The apparatus of claim 1, wherein the processor is configured to modify association of the MLDP tunnel with the outgoing interface list of the multicast SG by:
adding the MLDP tunnel to the outgoing interface list of the multicast SG by faking an Internet Group Management Protocol (IGMP) local membership join for the multicast SG on the MLDP tunnel.

7. The apparatus of claim 6, wherein the processor is configured to support a Protocol Independent Multicast (PIM) module supporting a PIM protocol, wherein the processor is configured to fake the IGMP local membership join for the multicast SG on the MLDP tunnel by:
  causing the PIM module to generate the IGMP local membership join such that the IGMP local membership join is directed to the PIM module.

8. The apparatus of claim 1, wherein the processor is configured to modify association of the MLDP tunnel with the outgoing interface list of the multicast SG by:
  removing the MLDP tunnel from the outgoing interface list of the multicast SG by faking an Internet Group Management Protocol (IGMP) local membership prune for the multicast SG on the MLDP tunnel.

9. The apparatus of claim 8, wherein the processor is configured to support a Protocol Independent Multicast (PIM) module supporting a PIM protocol, wherein the processor is configured to fake the IGMP local membership prune for the multicast SG on the MLDP tunnel by:
  causing the PIM module to generate the IGMP local membership prune such that the IGMP local membership prune is directed to the PIM module.

10. The apparatus of claim 1, wherein the processor is configured to:
  designate a Protocol Independent Multicast (PIM) protocol as a designated router (DR) on the MLDP tunnel; and
  propagate a PIM multicast group join message toward the multicast source, wherein the PIM multicast group join message comprises the information associated with the multicast SG.

11. A method, comprising:
  using a processor and a memory for:
    receiving information associated with a multicast source and multicast group (multicast SG) that is associated with a Multicast Label Distribution Protocol (MLDP) tunnel; and
    modifying association of the MLDP tunnel with an outgoing interface list of the multicast SG by faking an Internet Group Management Protocol (IGMP) local membership operation for the multicast SG on the MLDP tunnel.

12. The method of claim 11, further comprising:
  supporting an MLDP module supporting the MLDP and a Protocol Independent Multicast (PIM) module supporting a PIM protocol.

13. The method of claim 12, further comprising using the MLDP module for:
  creation or removal of the MLDP tunnel;
  extracting, from an MLDP Forwarding Equivalence Class (FEC), an encoded version of the information associated with the multicast SG; and
  propagating, toward the PIM module, the encoded version of the information associated with the multicast SG.

14. The method of claim 12, further comprising using the PIM module for:
  receiving, from the MLDP module, an encoded version of the information associated with the multicast SG;
  decoding the encoded version of the information associated with the multicast SG; and
  identifying the multicast SG based on the information associated with the multicast SG.

15. The method of claim 11, further comprising:
  detecting creation or removal of the MLDP tunnel;
  extracting, from an MLDP Forwarding Equivalence Class (FEC), an encoded version of the information associated with the multicast SG;
  decoding the encoded version of the information associated with the multicast SG; and
  identifying the multicast SG based on the information associated with the multicast SG.

16. The method of claim 11, wherein modifying association of the MLDP tunnel with the outgoing interface list of the multicast SG comprises:
  adding the MLDP tunnel to the outgoing interface list of the multicast SG by faking an Internet Group Management Protocol (IGMP) local membership join for the multicast SG on the MLDP tunnel.

17. The method of claim 16, wherein the processor is configured to support a Protocol Independent Multicast (PIM) module supporting a PIM protocol, wherein faking the IGMP local membership join for the multicast SG on the MLDP tunnel comprises:
  causing the PIM module to generate the IGMP local membership join such that the IGMP local membership join is directed to the PIM module.

18. The method of claim 11, wherein modifying association of the MLDP tunnel with the outgoing interface list of the multicast SG comprises:
  removing the MLDP tunnel from the outgoing interface list of the multicast SG by faking an Internet Group Management Protocol (IGMP) local membership prune for the multicast SG on the MLDP tunnel.

19. The method of claim 18, wherein the processor is configured to support a Protocol Independent Multicast (PIM) module supporting a PIM protocol, wherein faking the IGMP local membership prune for the multicast SG on the MLDP tunnel comprises:
  causing the PIM module to generate the IGMP local membership prune such that the IGMP local membership prune is directed to the PIM module.

20. The method of claim 11, further comprising:
  designating a Protocol Independent Multicast (PIM) protocol as a designated router (DR) on the MLDP tunnel; and
  propagating a PIM multicast group join message toward the multicast source, wherein the PIM multicast group join message comprises the information associated with the multicast SG.

* * * * *